US010328623B2

(12) United States Patent
Tan et al.

(10) Patent No.: US 10,328,623 B2
(45) Date of Patent: *Jun. 25, 2019

(54) ACTUATOR COOLING APPARATUS AND METHOD

(71) Applicant: Synventive Molding Solutions, Inc., Peabody, MA (US)

(72) Inventors: Zhuang Rui Tan, Evanston, IL (US); Christian Carey, Middleboro, MA (US); Vito Galati, Rowley, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 277 days.

This patent is subject to a terminal disclaimer.

(21) Appl. No.: 15/596,415

(22) Filed: May 16, 2017

(65) Prior Publication Data

US 2017/0246784 A1     Aug. 31, 2017

Related U.S. Application Data

(63) Continuation of application No. 14/459,622, filed on Aug. 14, 2014, now Pat. No. 9,682,504, which is a
(Continued)

(51) Int. Cl.
    *B29C 45/74*      (2006.01)
    *B29C 45/73*      (2006.01)
(Continued)

(52) U.S. Cl.
CPC ...... *B29C 45/7331* (2013.01); *B29C 45/2725* (2013.01); *B29C 45/2737* (2013.01);
(Continued)

(58) Field of Classification Search
CPC ...... B29C 45/72; B29C 45/74; B29C 45/7271
See application file for complete search history.

(56) References Cited

U.S. PATENT DOCUMENTS

| 4,057,382 A | 11/1977 | Yamamori |
| 5,356,576 A | 10/1994 | Fischbach |
(Continued)

FOREIGN PATENT DOCUMENTS

| DE | 102009012082 B3 | 10/2010 |
| EP | 0269091 A2 | 1/1988 |
(Continued)

OTHER PUBLICATIONS

Int'l. Search Report and Written Opinion dated Feb. 5, 2015 in Int'l. Appln. No. PCT/US2014/051026.
(Continued)

*Primary Examiner* — James Sanders
(74) *Attorney, Agent, or Firm* — Polsinelli, PC

(57) ABSTRACT

An injection molding apparatus comprising a heated manifold, an actuator comprised of an actuator housing containing a drive member interconnected to a valve pin having a drive axis, one or more heat convectors each heat convector comprised of a heat conductive leg disposed within a gap disposed between the manifold and a downstream end of the actuator housing and a heat conductive arm extending distally upstream and away from the gap such that heat is conducted from the leg to the arm upstream and away from the downstream end of the actuator housing.

23 Claims, 9 Drawing Sheets

Related U.S. Application Data continuation-in-part of application No. PCT/US2014/039932, filed on May 29, 2014, said application No. 15/596,415 is a continuation-in-part of application No. 13/484,336, filed on May 31, 2012, now Pat. No. 9,011,736, which is a continuation of application No. PCT/US2011/062099, filed on Nov. 23, 2011, said application No. 15/596,415 is a continuation-in-part of application No. 13/484,408, filed on May 31, 2012, now Pat. No. 9,005,509, which is a continuation of application No. PCT/US2011/062096, filed on Nov. 23, 2011, said application No. 14/459,622 is a continuation-in-part of application No. PCT/US2012/067379, filed on Nov. 30, 2012, and a continuation-in-part of application No. PCT/US2013/053591, filed on Aug. 5, 2013.

(60) Provisional application No. 61/828,391, filed on May 29, 2013.

(51) Int. Cl.
  *B29C 45/28* (2006.01)
  *B29C 45/72* (2006.01)
  *B29C 45/27* (2006.01)

(52) U.S. Cl.
  CPC ........ *B29C 45/2738* (2013.01); *B29C 45/281* (2013.01); *B29C 45/2806* (2013.01); *B29C 45/72* (2013.01); *B29C 2045/2733* (2013.01); *B29C 2045/2848* (2013.01); *B29C 2045/7271* (2013.01)

(56) References Cited

U.S. PATENT DOCUMENTS

| | | |
|---|---|---|
| 5,556,582 A | 9/1996 | Kazmer et al. |
| 6,294,122 B1 | 9/2001 | Moss et al. |
| 6,343,925 B1 | 2/2002 | Jenko |
| 6,464,909 B1 | 10/2002 | Kazmer et al. |
| 7,029,268 B2 | 4/2006 | Doyle et al. |
| 7,588,436 B2 | 9/2009 | Tooman et al. |
| 8,349,244 B2 | 1/2013 | Wernz et al. |
| 8,562,336 B2 | 10/2013 | Lee |
| 8,728,378 B2 | 5/2014 | Lee |
| 2010/0225025 A1 | 9/2010 | Striegel |
| 2012/0231109 A1 | 9/2012 | Lee |

FOREIGN PATENT DOCUMENTS

| | | |
|---|---|---|
| EP | 2360003 A1 | 8/2011 |
| JP | 06064002 | 8/1994 |

OTHER PUBLICATIONS

Written Opinion of the Int'l. Preliminary Examining Authority dated Dec. 4, 2015 in corresponding application, PCT/US2014/051026.
Int'l. Preliminary Report on Patentability dated Sep. 7, 2016 in corresponding application, PCT/US2014/\051026.
Amendment under ARticle 34 and Response to Written Opinion filed Jun. 2, 2016 in corresponding application, PCT/US2014/051026.
Response to IPER Examination and Opinion of the IPEA of Sep. 7, 2016 filed Sep. 20, 2016 in corresponding application/ PCT/US2014/051026.
International Search Report and Written Opinion dated Mar. 29, 2012 in Int'l. Application No. PCT/US2011/062099.
International Search Report and Written Opinion dated Apr. 13, 2012 in Int'l. Application No. PCT/US2011/062096.

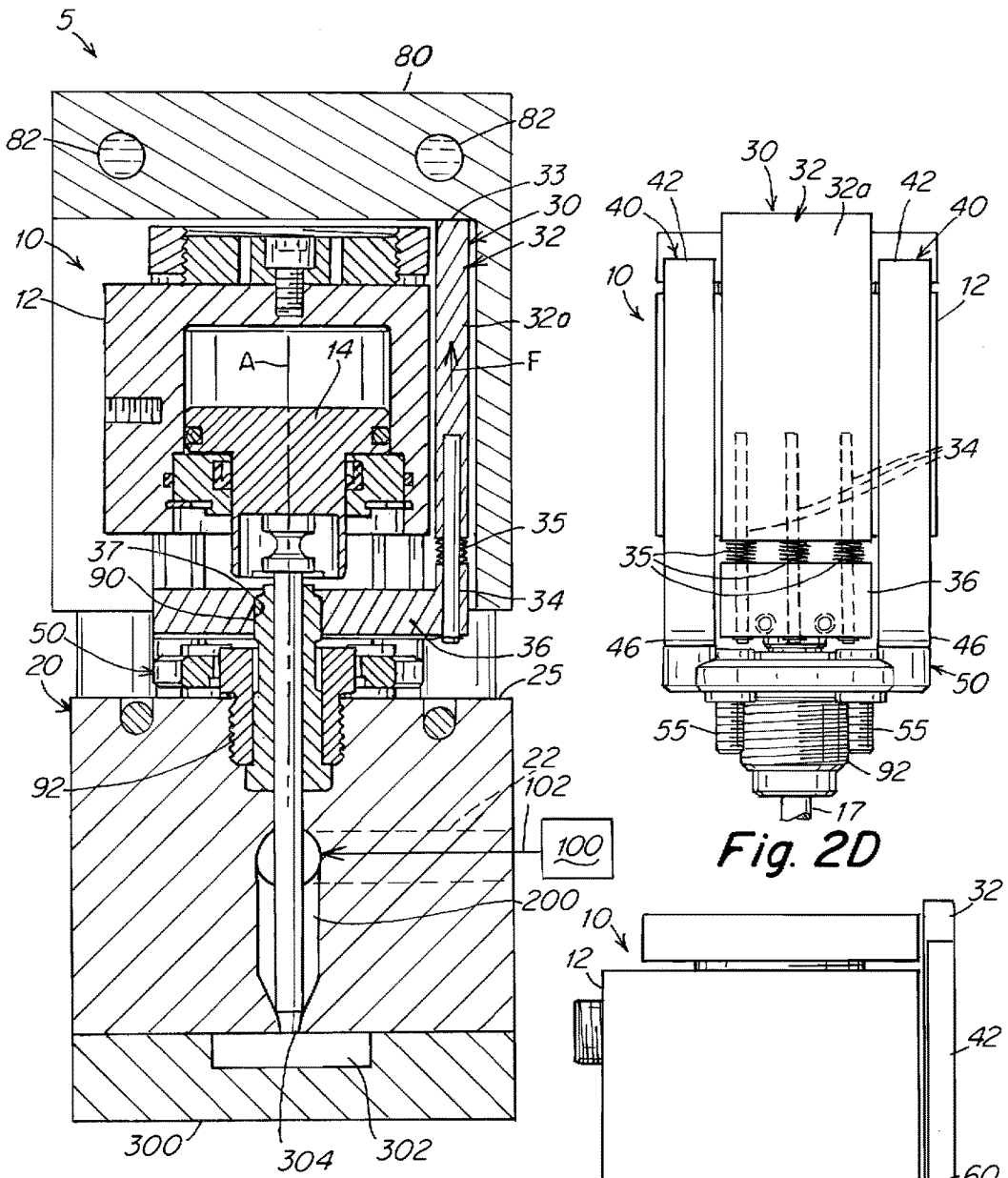
Fig. 2C
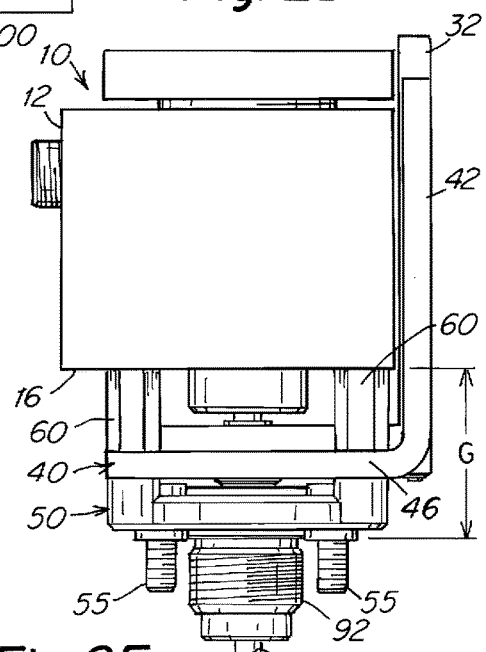
Fig. 2D
Fig. 2E

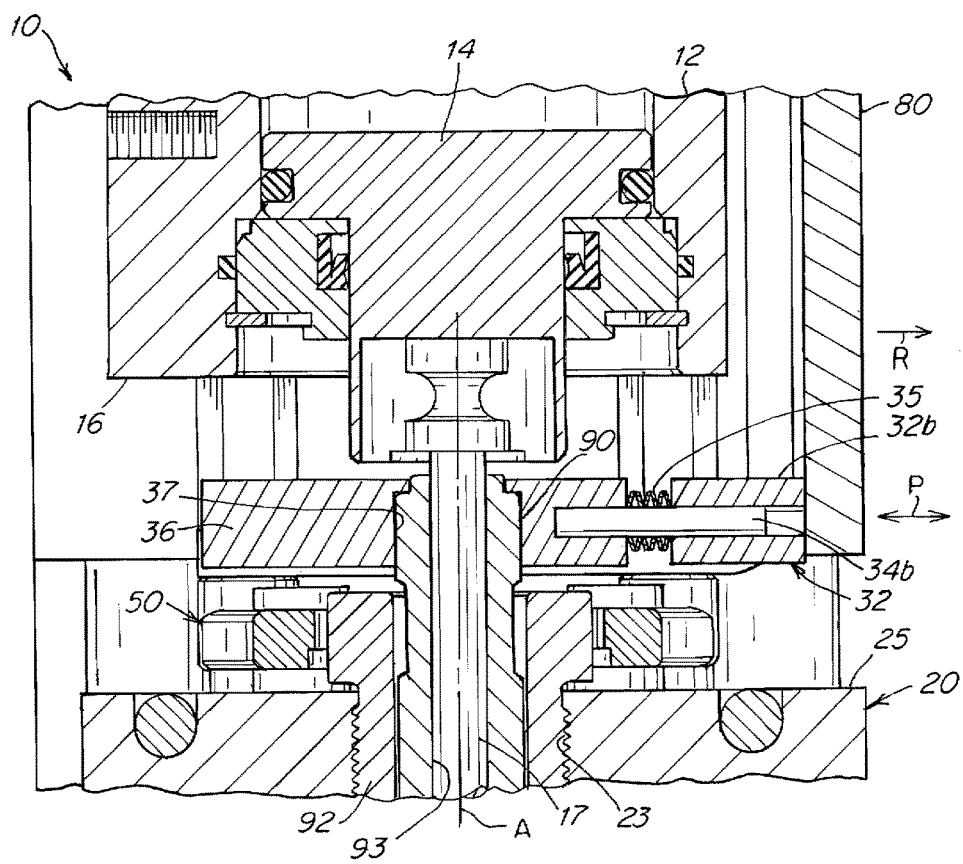
Fig. 2CCC

ACTUATOR COOLING APPARATUS AND METHOD

RELATED APPLICATIONS

This application is a continuation of and claims the benefit of priority to U.S. application Ser. No. 14/459,622 filed Aug. 14, 2014, which is a continuation-in-part of and claims the benefit of priority to U.S. international application Serial no. PCT/US14/39932 filed May 29, 2014 which claims priority to U.S. Provisional application Ser. No. 61/828,391 filed May 29, 2013, the disclosures of the foregoing of which are incorporated by reference in their entirety as if fully set forth herein.

This application is also a continuation-in-part of and claims the benefit of priority to U.S. application Ser. No. 13/484,336 filed May 31, 2012 which is a continuation of PCT/US2011/062099 filed Nov. 23, 2011, the disclosures of both of the foregoing are incorporated by reference in their entirety as if fully set forth herein.

This application is also a continuation-in-part of and claims the benefit of priority to U.S. application Ser. No. 13/484,408 filed May 31, 2012 which is a continuation of PCT/US2011/062096 filed Nov. 23, 2011, the disclosures of both of the foregoing are incorporated by reference in their entirety as if fully set forth herein.

This application is also a continuation-in-part of and claims the benefit of priority to PCT/US2012/067379 (publication no WO 2014/025369) filed Nov. 30, 2012, the disclosure of which is incorporated by reference in its entirety as if fully set forth herein.

This application is also a continuation-in-part of and claims the benefit of priority to PCT/US13/053591 (publication no WO 2014/025674) filed Aug. 5, 2013, the disclosure of which is incorporated by reference in its entirety as if fully set forth herein.

The disclosures of all of the following are incorporated by reference in their entirety as if fully set forth herein: U.S. Pat. Nos. 5,894,025, 6,062,840, 6,294,122, 6,309,208, 6,287,107, 6,343,921, 6,343,922, 6,254,377, 6,261,075, 6,361,300, 6,419,870, 6,464,909, 6,599,116, 7,234,929, 7,419,62, 7,569,169, U.S. patent application Ser. No. 10/214,118, filed Aug. 8, 2002, U.S. Pat. No. 7,029,268, 7,270,537, 7,597,828, U.S. patent application Ser. No. 09/699,856 filed Oct. 30, 2000, U.S. patent application Ser. No. 10/269,927 filed Oct. 11, 2002, U.S. application Ser. No. 09/503,832 filed Feb. 15, 2000, U.S. application Ser. No. 09/656,846 filed Sep. 7, 2000, U.S. application Ser. No. 10/006,504 filed Dec. 3, 2001, U.S. application Ser. No. 10/101,278 filed Mar. 19, 2002 and PCT Application No. PCT/US11/062099 and PCT Application No. PCT/US11/062096, U.S. Pat. Nos. 8,562,336, 8,091,202 and 8,282,388.

BACKGROUND OF THE INVENTION

Injection molding systems have been developed employing mount mechanisms for actuators that are cooled via injection of water through water flow channels as shown for example in U.S. Pat. No. 8,562,336, the disclosure of which is incorporated herein by reference in its entirety as if fully set forth.

SUMMARY OF THE INVENTION

An injection molding apparatus comprising:
a heated manifold that receives an injection fluid material from an injection molding machine, the heated manifold routing the injection fluid to a fluid delivery channel that extends and delivers the injection fluid material under an injection pressure to a gate of a mold cavity, an actuator comprising an actuator housing containing a drive member interconnected to a valve pin having a drive axis in an arrangement such that the valve pin is drivable along the axis through a selected stroke length between an upstream fully gate open position and a downstream gate closed position, the actuator housing being mounted on an upstream surface of the heated manifold, a downstream end of the actuator housing being spaced a selectable distance upstream of the upstream surface forming a gap between the downstream end of the actuator housing and the upstream surface of the heated manifold, the apparatus including one or more heat convectors each heat convector comprised of:

a heat conductive leg disposed within the gap and mounted in heat conductive communication with the heated manifold, and a heat conductive arm extending distally upstream and away from the gap out of contact with the actuator housing such that heat is conducted from the leg to the arm upstream and away from the downstream end of the actuator housing.

The heat conductive leg of at least one of the one or more heat convectors is typically mounted in metal-to-metal heat conductive communication with the heated manifold.

The heat conductive arm of at least one of the one or heat convectors is preferably spaced radially apart from the actuator housing relative to the drive axis.

An upstream end of the heat conductive arm of at least one of the one or more heat convectors is preferably disposed in metal-to-metal heat conductive communication with a plate that is mounted in heat conductive isolation from the heated manifold.

The heat conductive arm of at least one of the one or more heat convectors can include a metal finger that is disposed in metal-to-metal contact under constant force with the plate.

The metal finger is typically slidably mounted on the arm in engagement with a spring, the metal finger being engagable in metal-to-metal contact with the plate under spring force exerted by the spring when compressed.

The apparatus typically further comprises a bushing mounted in metal-to-metal heat conductive contact with the heated manifold, the valve pin being slidably received within a guide channel of the bushing for reciprocally driven upstream-downstream movement along the drive axis of the valve pin, wherein at least one of the one or more heat convectors has a leg that is mounted in metal-to-metal heat conductive contact with the bushing.

The leg of at least one of the one or more heat convectors is preferably mounted in metal-to-metal heat conductive contact with the heated manifold.

The one or more heat convectors can comprise at least first and second heat convectors, each leg of each heat convector being mounted in metal-to-metal heat conductive communication with the heated manifold.

The heat conductive arm of at least one of the first and second heat convectors is typically spaced radially apart from the actuator housing relative to the drive axis.

An upstream end of the heat conductive arm of at least one of the first and second heat convectors is preferably disposed in metal-to-metal heat conductive communication with a plate that is mounted in heat conductive isolation from the heated manifold.

The apparatus typically further comprises a bushing mounted in metal-to-metal heat conductive contact with the heated manifold, the valve pin being slidably received within a guide channel of the bushing for reciprocally driven upstream-downstream movement along the drive axis of the valve pin, wherein the leg of at least one of first and second heat convectors is mounted in metal-to-metal heat conductive contact with the bushing.

The apparatus can further comprise an actuator mount that is mounted in metal-to-metal heat conductive contact with the heated manifold, wherein the leg of at least one of the one or more heat convectors is mounted in metal-to-metal heat conductive contact with the actuator mount.

The apparatus of typically further comprises an actuator mount that is mounted in metal-to-metal heat conductive contact with the heated manifold, wherein the leg of at least one of the first and second heat convectors is mounted in metal-to-metal heat conductive contact with the actuator mount.

The leg of at least one or more of the heat convectors can be mounted in metal to metal heat conductive contact with the actuator housing.

Typically the leg of at least one or more of the heat convectors is mounted in metal to metal heat conductive contact with an insulator or standoff that is mounted in heat conductive contact with the actuator housing.

The heat conductive arm of at least one of the one or more heat convectors can be spaced apart from the actuator housing extending along an axis or direction that is generally perpendicular to the drive axis. Alternatively the heat conductive arm of at least one of the one or more heat convectors can be spaced apart from the actuator housing extending along an axis or direction that is generally parallel to the drive axis.

In another aspect of the invention there is provided a method of performing an injection cycle with an injection molding apparatus that is comprised of:

a heated manifold containing a distribution channel that receives an injection fluid material from an injection molding machine, the heated manifold routing the injection fluid from the distribution channel to a fluid delivery channel that extends and delivers the injection fluid material under an injection pressure to a gate of a cavity of a mold, an actuator comprising an actuator housing containing a drive member interconnected to a valve pin having a drive axis in an arrangement such that the valve pin is drivable along the axis through a selected stroke length between an upstream fully gate open position and a downstream gate closed position, the actuator housing being mounted on an upstream surface of the heated manifold, a downstream end of the actuator housing being spaced a selectable distance upstream of the upstream surface forming a gap between the downstream end of the actuator housing and the upstream surface of the heated manifold, the apparatus including one or more heat convectors each heat convector comprised of:

a heat conductive leg disposed within the gap and mounted in heat conductive communication with the heated manifold, and a heat conductive arm extending distally upstream and away from the gap such that heat is conducted from the leg to the arm upstream and away from the downstream end of the actuator housing, the method comprising:

injecting a selected injection fluid from the injection molding machine into the distribution channel of the manifold under a pressure sufficient to route the injection fluid to the fluid delivery channel, and, continuing to inject the injection fluid for a time sufficient to force the injection fluid to be routed into the cavity of the mold.

In such a method the one or more heat convectors preferably comprises at least first and second heat convectors, each leg of each heat convector being mounted in metal-to-metal heat conductive communication with the heated manifold.

In such a method the heat conductive arm of at least one of the first and second heat convectors is preferably spaced radially apart from the actuator housing relative to the drive axis.

In such a method an upstream end of the heat conductive arm of at least one of the first and second heat convectors is preferably disposed in metal-to-metal heat conductive communication with a plate that is mounted in heat conductive isolation from the heated manifold.

In another aspect of the invention there is provided an injection molding apparatus comprising:

a heated manifold that receives an injection fluid material from an injection molding machine, the heated manifold routing the injection fluid to a fluid delivery channel that extends and delivers the injection fluid material under an injection pressure to a gate of a mold cavity, an actuator comprising an actuator housing containing a drive member interconnected to a valve pin having a drive axis in an arrangement such that the valve pin is drivable along the axis through a selected stroke length between an upstream fully gate open position and a downstream gate closed position, the actuator housing being mounted on an upstream surface of the heated manifold, a downstream end of the actuator housing being spaced a selectable distance upstream of the upstream surface forming a gap between the downstream end of the actuator housing and the upstream surface of the heated manifold, the apparatus including first and second heat convectors each heat convector comprised of:

a heat conductive leg disposed within the gap and mounted in heat conductive communication with the heated manifold, and a heat conductive arm extending distally upstream and away from the gap out of contact with the actuator housing such that heat is conducted from the leg to the arm upstream and away from the downstream end of the actuator housing.

The heat conductive leg of at least one of the one or more heat convectors is typically mounted in metal-to-metal heat conductive communication with the heated manifold.

The heat conductive arm of at least one of the one or heat convectors is typically spaced radially apart from the actuator housing relative to the drive axis.

An upstream end of the heat conductive arm of at least one of the first and second heat convectors is typically disposed in metal-to-metal heat conductive communication with a plate that is mounted in heat conductive isolation from the heated manifold.

Such an apparatus preferably further comprises a bushing mounted in metal-to-metal heat conductive contact with the heated manifold, the valve pin being slidably received within a guide channel of the bushing for reciprocally driven upstream-downstream movement along the drive axis of the valve pin, wherein at least one of the first and second heat convectors has a leg that is mounted in metal-to-metal heat conductive contact with the bushing.

Such an apparatus typically further comprises an actuator mount that is mounted in metal-to-metal heat conductive contact with the heated manifold, wherein the leg of at least one of the first and second heat convectors is mounted in metal-to-metal heat conductive contact with the actuator mount.

Such an apparatus typically further comprises an actuator mount that is mounted in metal-to-metal heat conductive contact with the heated manifold, wherein the leg of at least one of the first and second heat convectors is mounted in metal-to-metal heat conductive contact with the actuator mount.

BRIEF DESCRIPTION OF THE DRAWINGS

The above and further advantages of the invention may be better understood by referring to the following description in conjunction with the accompanying drawings in which:

FIG. 2CC is an enlarged fragmentary detail view of a portion of FIG. 2.

FIG. 2CCC is a fragmentary cross-sectional view similar to FIG. 2CC but showing an alternate embodiment of a heat convector arranged along an axis perpendicular P to the drive axis A.

FIG. 2D is a rear side view of the FIG. 2 actuator.

FIG. 2E is a right side view of the FIG. 2 actuator.

DETAILED DESCRIPTION

Figure 1:
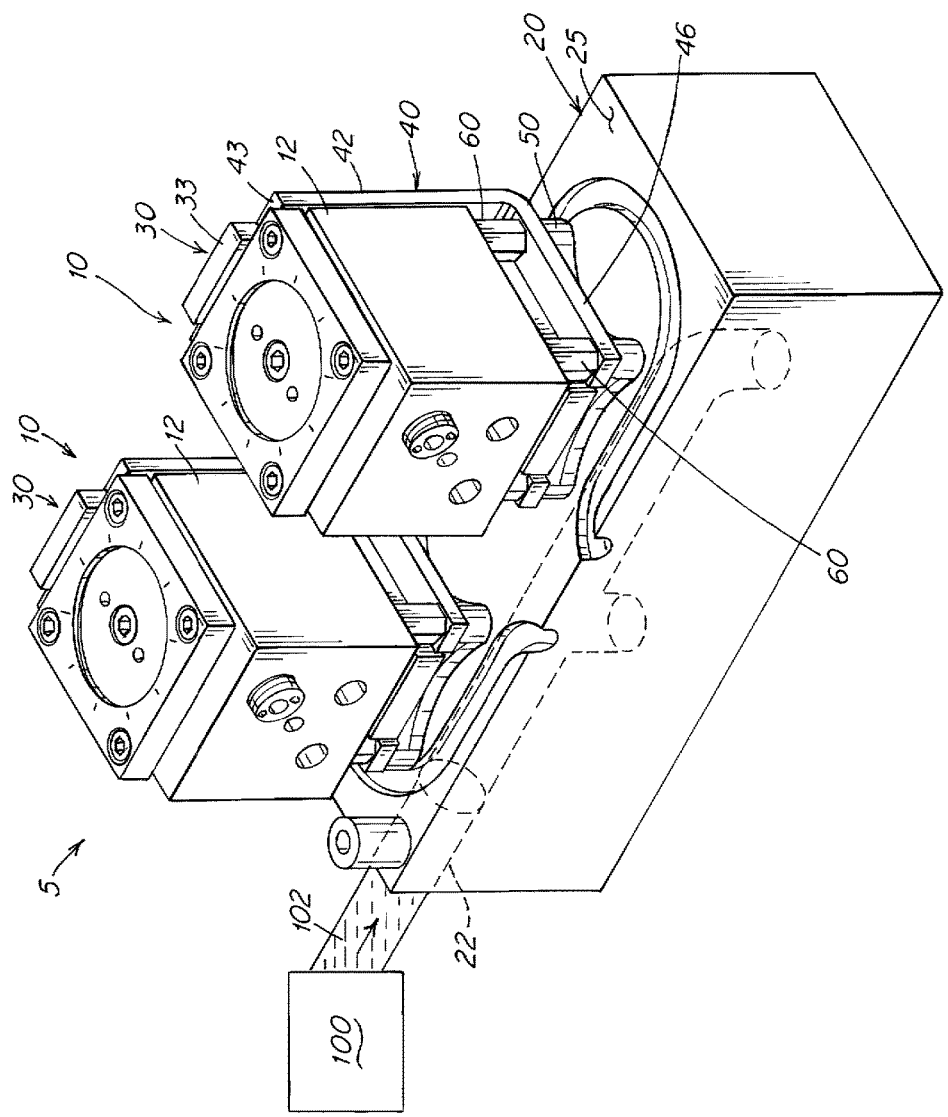
FIG. 1 is a top perspective view of a pair of actuators mounted on a heated manifold or hotrunner, each actuator having housings and heat convectors mounted in an arrangement according to one embodiment of the invention.

FIG. 1 shows a pair of actuators 10 mounted to a heated manifold 20 in conjunction with one exemplary embodiment of a pair of heat convectors 30, 40 according to the invention. As shown, an actuator 10 having a heat conductive housing 12, typically metal, is typically mounted on an actuator mount 50 which is in turn typically mounted via conventional mechanisms such as bolts 55, FIGS. 2E, 3E in compressed metal-to-metal heat conductive contact to and with the heated manifold 20. The mounting of the actuator housing 12 on the mount 50 is most preferably configured by mounting the housing 12 on an intermediate spacer or standoff 60 that is comprised of a thermally non-conductive material such as titanium, stainless steel, ceramic material or a thermally resistant polymeric material such as polyamide. As shown, the insulator-standoff 60 is bolted at a downstream end to the mount 50 and bolted at an upstream end to a guide bolt 62 that is housed within a sleeve 64 that thermally isolates the bolt 62 from the actuator housing 12. Thus, the housing 12 is substantially thermally isolated, separated and spaced from direct or indirect metal-to-metal contact with the heated manifold 20 or the mount 50.

With reference to the FIGS. 2, 2A, 2B, 2C, 2CC, 2CCC, 2D, 2E, 2F, 2G embodiment, the apparatus 5 comprises a heated manifold 20 that receives an injection fluid material 102 injected under high pressure and temperature from an injection molding machine 100 into a fluid distribution channel 22 of the manifold 20. The heated manifold 20 routes the injection fluid 102 to a downstream fluid delivery channel 200 that extends and delivers the injection fluid material under an injection pressure to a gate 304 of a cavity 302 of a mold 300.

Figure 2:
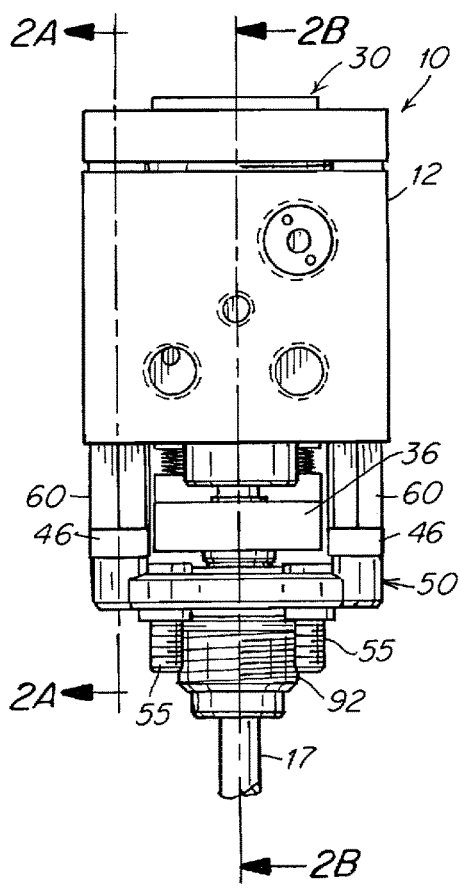
FIG. 2 is a front side view of one of the actuators of the FIG. 1 system mounted to the manifold in conjunction with a first exemplary embodiment of heat convectors according to the invention.
Figure 2A:
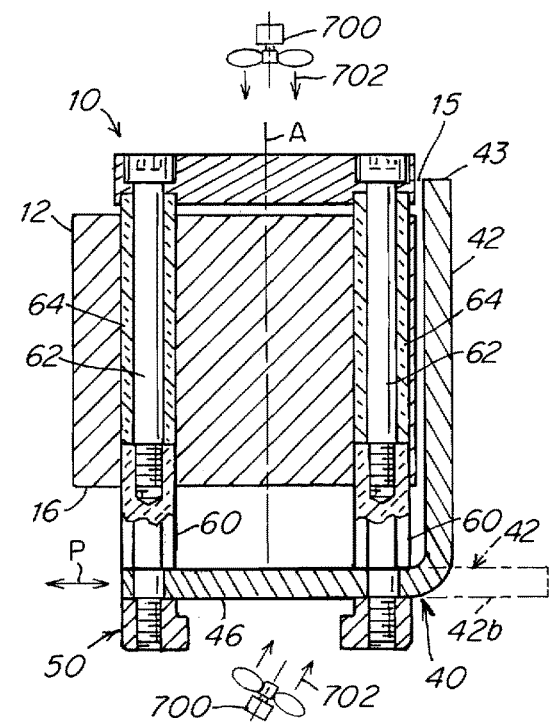
FIG. 2A is a sectional view taken along lines 2A-2A of FIG. 2.
Figure 2B:
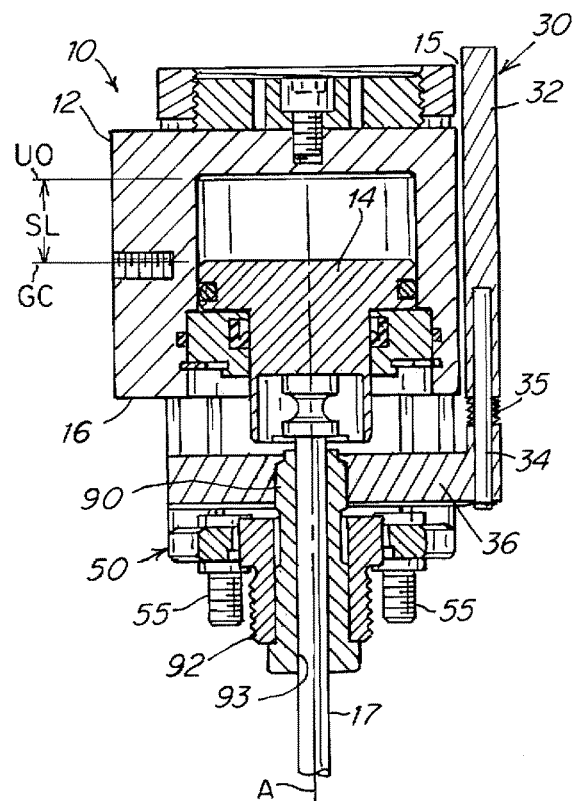
FIG. 2B is a sectional view taken along lines 2B-2B of FIG. 2.
Figure 2C:
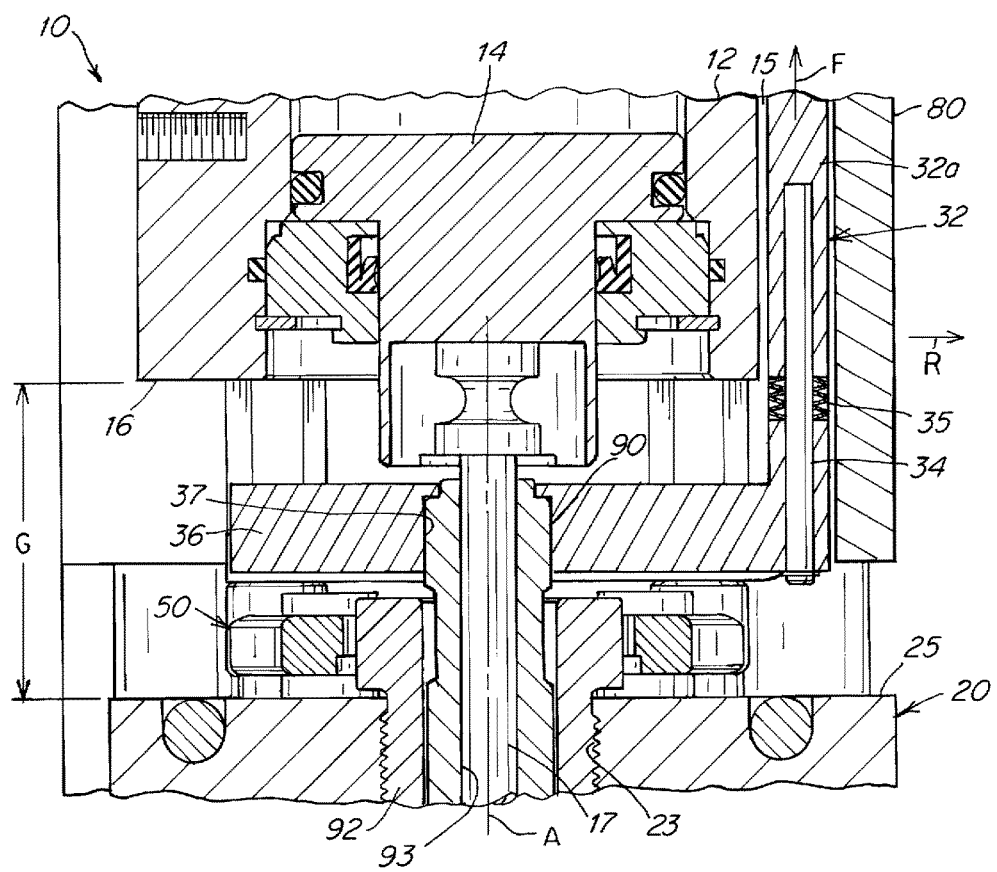
FIG. 2C is view similar to FIG. 2B showing the actuator mounted on a hotrunner or heated manifold and showing a top clamping plate assembled together with the apparatus and the heat convective arm of one of the heat convectors of the apparatus in spring-loaded metal-to-metal contact with the top clamping plate.
Figure 2F:
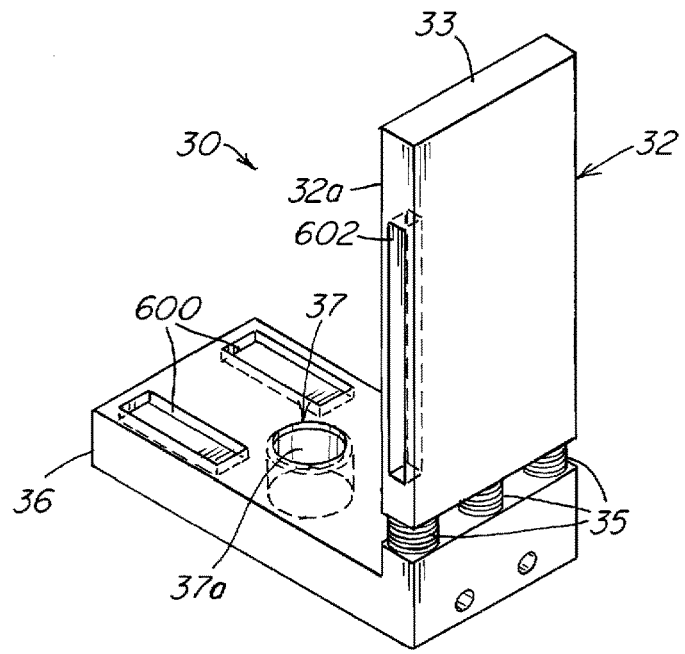
FIG. 2F is a top perspective view of one of the two heat convectors of the FIG. 2 apparatus that mounts to the valve pin guide bushing and includes a spring-loaded finger mounted to the arm portion of the convector.
Figure 2G:
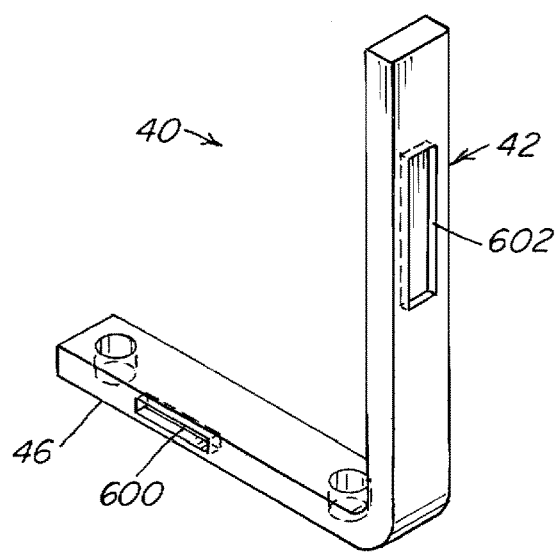
FIG. 2G is a top perspective view of another one of the two heat convectors of the FIG. 2 apparatus that mounts to an actuator mount that is mounted on the heated manifold.

In the FIGS. 2-2G embodiment, the actuator housing 12 contains a drive member 14 such as a piston that is interconnected at its downstream end to an upstream end of a valve pin 17 having a drive axis A in an arrangement such that the valve pin 17 is drivable along the drive axis A through a selected stroke length SL between an upstream fully gate open position UO and a downstream gate closed position GC. The actuator housing 12 is mounted on an upstream surface 25 of the heated manifold 20. A downstream end 16 of the actuator housing 12 is spaced a selectable distance upstream of the upstream surface forming a gap G between the downstream end 16 of the actuator housing 12 and the upstream surface 25 of the heated manifold 20.

As shown in FIGS. 1-3G the apparatus 5 includes one or more heat convectors 30, 40 each heat convector having a heat conductive leg 36, 46 that is disposed within the gap G in heat conductive communication with the heated manifold 20. Each convector 30, 40 has a heat conductive arm 32, 42 and arm portion 32a, 42a that extends distally upstream and radially away R from the gap G and manifold 20 and actuator housing 12 such that heat is conducted from the leg 36, 46 to the arm 32, 42 upstream and radially away R from the downstream end 16 of the actuator housing 12. The distal arm portions 32a, 42a typically extend along an axis or direction P that is generally parallel to the drive axis A of the piston 14 and valve pin 17.

In an alternative embodiment as shown in FIGS. 2A and 2CCC, the convectors 30, 40 can be configured and adapted such that the distally extending portion 32b, 42b of the arm 32, 42 extends distally such that it is spaced radially R away from the gap G and manifold 20 and the actuator housing 12. The distal arm portions 32b, 42b typically extend along an axis or direction P that is generally perpendicular to the drive axis A of the piston 14 and valve pin 17.

With reference to FIGS. 1-3G, the heat conductive leg 36, 46 of at least one of the heat convectors 30, 40 is mounted in metal-to-metal heat conductive communication with the heated manifold 20. As shown in the Figures, the leg 36 of one of the convectors 30 is mounted in metal-to-metal contact with the guide bushing 90 via force or slip fitting of the bushing head 90 into a complementary aperture 37 provided in leg 36 where the interior circumferential surface 37a is in intimate contact with the outside circumferential surface of the head of bushing 90. The bushing 90 is in turn mounted in metal-to-metal thermally conductive contact with the outer mounting portion 92 of the guide bushing which is in turn mounted in metal-to-metal contact with the heated manifold 20 as shown via slip or force fit insertion of bushing portion 92 into a complementary mounting aperture 23 provided in manifold body 20.

The leg 46 of the other of the convector 40 is mounted in metal-to-metal contact with the mount 50 which is in turn mounted in metal-to-metal contact with the upstream surface 25 of the heated manifold or hotrunner 20.

Figure 3:
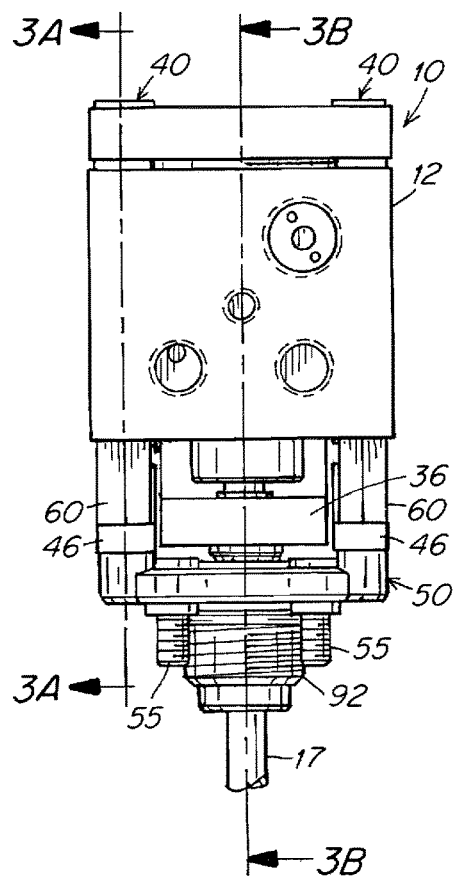
FIG. 3 is a front side view of one of the actuators of the FIG. 1 system mounted to the manifold in conjunction with a second exemplary embodiment of heat convectors according to the invention.
Figure 3A:
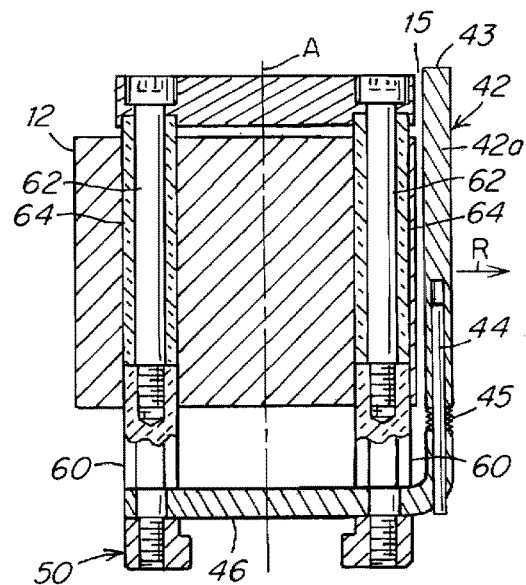
FIG. 3A is a sectional view taken along lines 3A-3A of FIG. 3.
Figure 3B:
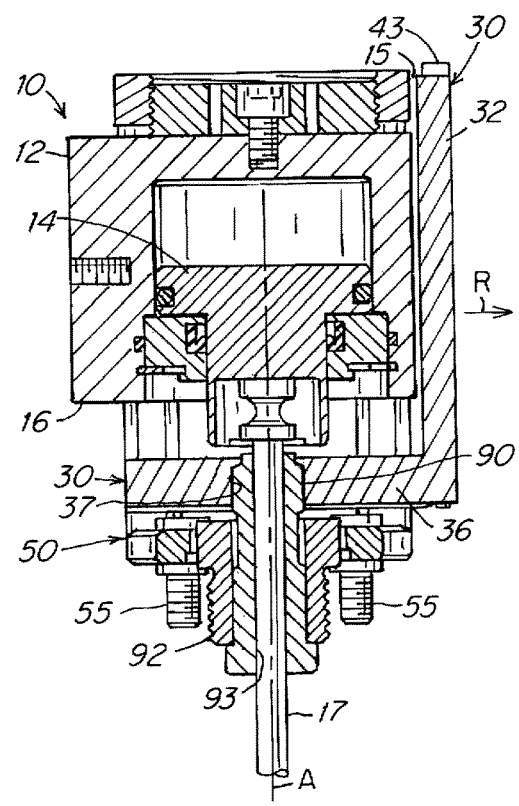
FIG. 3B is a sectional view taken along lines 3B-3B of FIG. 3.

Legs 36, 46 are in heat conductive communication with the manifold 20 by virtue of their mounting or disposition within gap G. Legs 36, 46 are also either integral with or in direct metal-to-metal contact with arms 32, 42. Heat that is transmitted to or contained within legs 36, 46 is transmitted or convected radially along the length of the legs 36, 46 to the arms 32, 42 which in turn transmit and dissipate the transmitted heat in the upstream direction. As shown, the legs 36, 46 are spatially separated from the bottom end or undersurface 16 of the actuator housing 12. Legs 36 and 46 are also substantially thermally isolated from the actuator housing 12 except for relatively incidental downstream metal-to-metal contact by legs 46 with thermal insulator standoffs 60 and contact of leg 36 with bushing 90 which is in turn in contact with valve pin 17 which is in turn in contact with piston 14. Thus, legs 36, 46 are isolated from direct metal-to-metal contact with the actuator housing 12 or other actuator components and thermally isolated therefrom serving to maintain the actuator 10 in a relatively cool condition relative to the heated manifold. As shown in FIGS. 3, 3A, legs 46 are in metal-to-metal thermal or heat conductive contact with the actuator housing 12 by virtue of direct metal-to-metal contact of leg 46 with metal standoffs 60 which in turn are in direct metal-to-metal contact with housing 12.

The heat conductive arms 32, 42 of at least one of the heat convectors 30, 40 is spaced a distance 15 radially apart R from the actuator housing 12 relative to the drive axis A. Preferably both arms 32, 42 are spaced 15 apart from direct metal-to-metal contact with the actuator housing 12. Such spacing 15 serves to enable the arms 32, 42 to transmit heat contained with the arms 32, 42 to ambient surrounding air or gas thus thermally isolating the actuator 10 and its components from direct heat or thermal communication with the heated manifold 20.

Figure 3C:
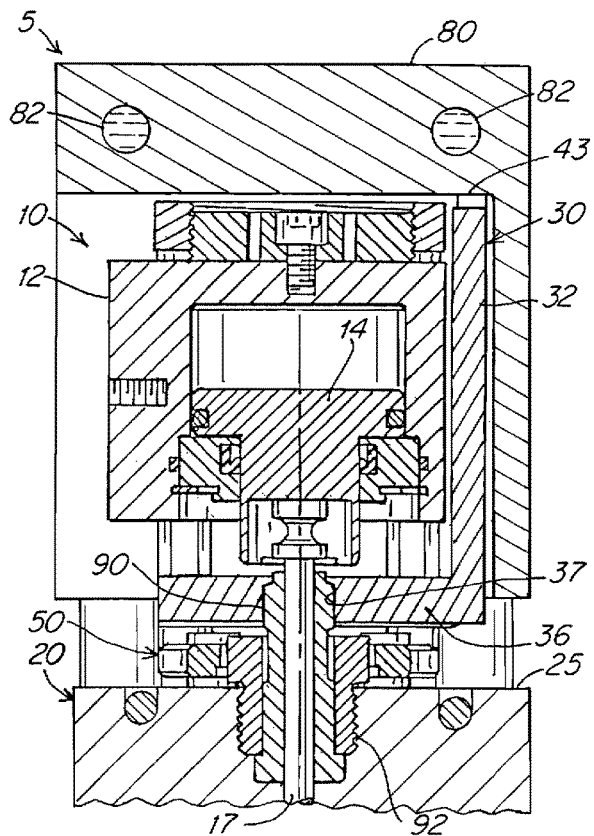
FIG. 3C is view similar to FIG. 3B showing the actuator mounted on a hotrunner or heated manifold and showing a top clamping plate assembled together with the apparatus and the heat convective arm of one of the heat convectors of the apparatus in spring-loaded metal-to-metal contact with the top clamping plate.
Figure 3D:
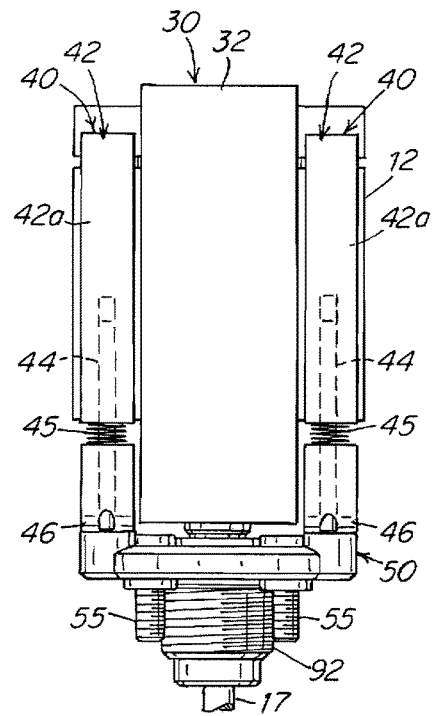
FIG. 3D is a rear side view of the FIG. 3 actuator.
Figure 3E:
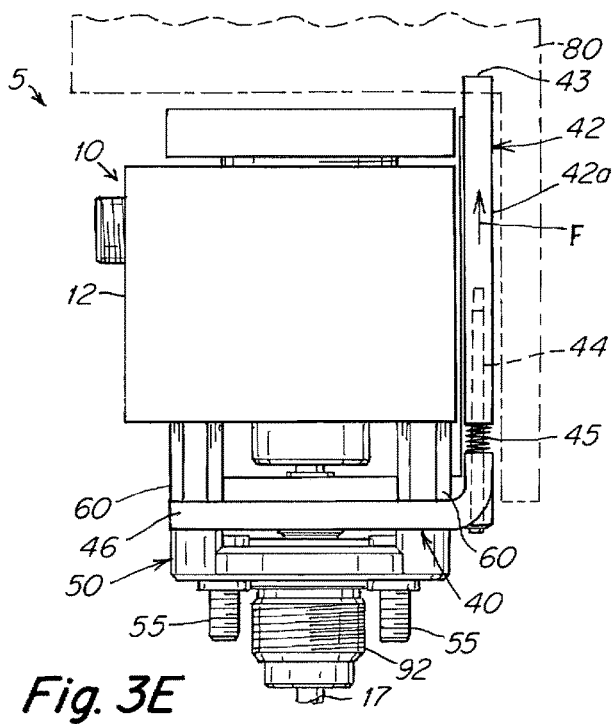
FIG. 3E is a right side view of the FIG. 3 actuator.
Figure 3F:
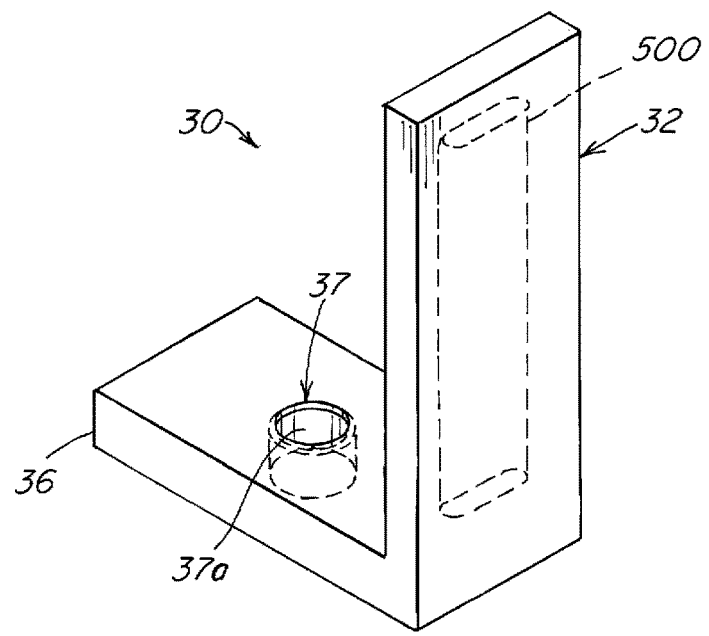
FIG. 3F is a top perspective view of one of the two heat convectors of the FIG. 3 apparatus that mounts to the valve pin guide bushing.

As shown in FIGS. 2C, 3C, 3E, an upstream end 33, 43 of the heat conductive finger portions 32a, 42a of arms 32, 42 of at least one of the heat convectors 30, 40 can be disposed in metal-to-metal heat conductive communication with a relatively cool plate 80 such as a top clamping plate that is mounted in heat conductive isolation from the heated manifold 20. As shown, the arms 32, 42 can be configured to include a finger 32a, 42a that is slidably mounted on a rod 34, 44 that is in turn mounted to a leg 36, 46 as shown. A spring 35, 45 can be disposed between the fingers 32a, 42a and their mounting structure 36, 46 and the assembly assembled together with cooled plate 80 in an arrangement whereby the spring 35, 45 exerts a constant force F on the fingers 32a, 42a when the spring is compressed to urge the upstream end 33, 43 of the fingers 32a, 42a into compressed metal-to-metal contact with the relatively cool plate 80. In such a configuration, heat contained in the arms 32, 42 is transmitted to the cool plate 80 thus further serving to dissipate heat generated by the heated manifold 20 and to thermally isolate the actuator 10 and its components 12, 14 from heat generated by the manifold 20.

The valve pin 17 is slidably received within a complementary guide channel 93 of the bushing 90 for reciprocally driven upstream-downstream movement A along the drive axis A of the valve pin 17. An actuator mount is mounted in metal-to-metal heat conductive contact with the heated manifold, wherein the leg of at least one of the one or more heat convectors is mounted in metal-to-metal heat conductive contact with the actuator mount.

Figure 3G:
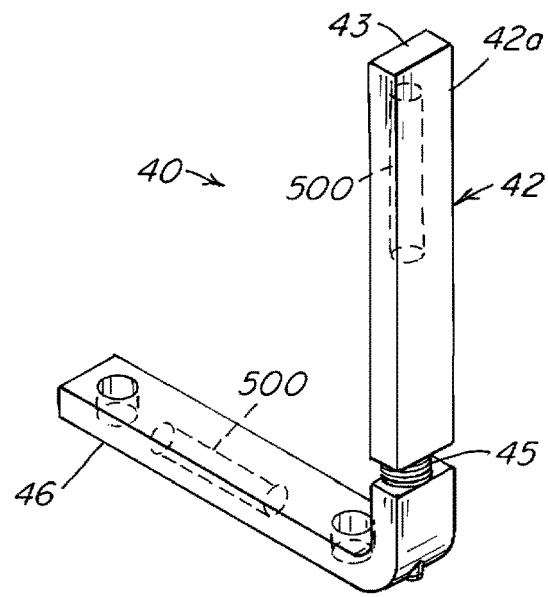
FIG. 3G is a top perspective view of another one of the two heat convectors of the FIG. 3 apparatus that mounts to an actuator mount that is mounted on the heated manifold and includes a spring-loaded finger mounted to the arm portion of the convector.

As shown in the alternative embodiment of FIGS. 3-3G, the convector 30 may comprise a single unitary metal or heat conductive component having a leg portion 36 that is mounted and disposed within the gap G between the manifold 20 and the downstream end 16 of the actuator 10.

Also in an alternative embodiment, the convectors 40 can comprise a leg portion 46 to which is mounted a movable arm portion 42 having a slidable finger 42a mounted as shown in FIGS. 3A, 3D, 3E, 3F for constant force F upstream urging into metal-to-metal heat conductive contact with plate 80. Such metal-to-metal contact causes heat contained within the arm 42 to be transmitted to and dissipated within the plate 80 thus serving to thermally isolate and insulate the actuator 10 and its components 12, 14 and the like.

In an alternative embodiment of the assembled apparatus 5, one or the other or both of the arm portions 32, 42 are not mounted such that they are in physical contact or engagement with the plate 80. Instead the upstream extension of the arms 32, 42 are disposed in contact with only surrounding ambient air which by itself effects dissipation of heat emanating from the manifold 20 that is transmitted to arms 32, 42.

The plate 80 is preferably maintained relatively cool relative to the manifold 20 by being mounted and assembled together with the manifold such that the plate 80 is thermally isolated from the manifold either by insulating standoffs between the manifold 20 and the plate 80 or by mounting the plate 80 to the mold without any metal-to-metal or other significant direct or indirect heat conductive contact between the plate 80 and the mold 20. The plate 80 can be proactively cooled by injection of cooling fluid such as water or antifreeze through cooling channels 82 that can be drilled into the body of the mounting plate (sometimes referred to as a top clamping plate or top clamp plate).

In an alternative embodiment as shown in FIGS. 2A and 2CCC, the convectors 30, 40 can be configured and adapted such that the distally extending portion 32b, 42b of the arm 32, 42 extends distally spaced away from the manifold 20 and the actuator housing 12 along an axis or direction P that is generally perpendicular to the drive axis A of the piston 14 and valve pin 17. The arms 32, 42 may or may not be in physical contact with a cooler or cooled plate such as top clamping plate 80. As shown in the FIG. 2A embodiments, the arm 32 is not in physical contact with another plate or relatively cool component but it could be so arranged if desired. As shown in FIG. 2CCC, the arm 32 and finger portion 32b in the embodiment where the arm extends along axis P are in physical contact under spring 35 force with the cool plate 80.

In another embodiment, heat conductive pipes 500 can be mounted within the body of the legs 36, 46 or arms 32, 42 of the heat convectors 30, 40 such heat conductive pipes containing heat conductive fluid as disclosed in U.S. Pat. Nos. 4,500,279, 4,389,002, 5,545,028, 5,554,395 and 5,885,628 the disclosures of all of which are incorporated by reference as if fully set forth herein. Such heat conductive pipes once mounted in metal-to-metal contact with a bore or channel drilled into the metal bodies of either a leg 36, 46 or arm 32, 42 will cause heat to conduct more readily and efficiently from and between the legs 36, 46 and the arm portions 32, 42 of the convectors or conductors 30, 40.

Notches, grooves, recesses and other engravings 600, 602 that increase the overall surface area of the legs 36, 46 and arms 32, 42 can be formed, drilled and engraved into the surfaces and bodies of the legs 36, 46 and arms 32, 42. Such engravings 600, 602 can increase the thermal conductivity of the convectors 30, 40 thus increasing the rate of thermal energy transfer between the legs and the arms as well as to the ambient air or to the plate 80.

A fan 700 that blows or circulate ambient air 702 in a direction into contact with the convectors 30, 40 can be included, the moving or circulating air 702 increasing the conductivity of heat between the legs and the arms as well as to the ambient air or to the plate 80.

What is claimed is:

1. An actuator cooling apparatus comprising:
  an actuator comprising an actuator housing containing a drive member interconnected to a valve pin having a drive axis, wherein the valve pin is drivable along the axis between an upstream gate open position and a downstream gate closed position for opening and closing a gate of a mold cavity,
  the actuator housing being mounted with respect to an upstream surface of a heated manifold such that a downstream surface of the actuator housing is spaced a selectable distance forming a gap between the downstream surface of the actuator housing and the upstream surface of the heated manifold,
  the actuator cooling apparatus including one or more heat convectors for maintaining the actuator in a relatively cool condition relative to the heated manifold, each heat convector comprised of:
  a heat conductive leg disposed within the gap, the leg being isolated from direct metal-to-metal contact with the actuator housing and mounted in heat conductive communication with the heated manifold, thus maintaining the actuator in a relatively cool condition relative to the heated manifold, and
  a heat conductive arm extending distally away from the gap such that heat is conducted from the leg to the arm and away from the actuator housing.

2. The apparatus of claim 1 wherein the heat conductive arm of at least one of the one or more of the heat convectors extends distally upstream and is spaced radially apart from the actuator housing relative to the drive axis.

3. The apparatus of claim 2 wherein an upstream end of the heat conductive arm of at least one of the one or more heat convectors is disposed in heat conductive communication with a relatively cool plate that is mounted in heat conductive isolation from the heated manifold.

4. The apparatus of claim 3 wherein the heat conductive arm of the at least one of the one or more heat convectors includes a metal finger that is disposed in metal-to-metal contact under spring force with the relatively cool plate.

5. The apparatus of claim 4 wherein the metal finger is slidably mounted on the arm in engagement with a spring, the metal finger being engagable in metal-to-metal contact with the relatively cool plate under spring force exerted by the spring when compressed.

6. The apparatus of claim 1 wherein the leg of at least one of the one or more heat convectors is mounted in metal-to-metal heat conductive contact with the heated manifold.

7. The apparatus of claim 1 further comprising a valve pin bushing mounted in metal-to-metal heat conductive contact with the heated manifold, the valve pin being slidably received within a guide channel of the bushing for reciprocally driven upstream-downstream movement along the drive axis of the valve pin, wherein the leg of at least one of the one or more heat convectors is mounted in metal-to-metal heat conductive contact with the valve pin bushing.

8. The apparatus of claim 1 wherein the leg of at least one of the one or more heat convectors is mounted in metal to metal heat conductive contact with a thermally insulating standoff that is mounted in heat conductive contact with the actuator housing.

9. The apparatus of claim 1 further comprising an actuator mount that is mounted in metal-to-metal heat conductive contact with the heated manifold, wherein the leg of at least one of the one or more heat convectors is mounted in metal-to-metal heat conductive contact with the actuator mount.

10. The apparatus of claim 1 wherein the heat conductive arm of at least one of the one or more heat convectors is spaced apart from the actuator housing extending along an axis or direction that is generally perpendicular to the drive axis.

11. The apparatus of claim 1 wherein the heat conductive arm of at least one of the one or more heat convectors is spaced apart from the actuator housing extending along an axis or direction that is generally parallel to the drive axis.

12. The apparatus of claim 1 wherein the one or more heat convectors comprises at least first and second heat convectors, each leg of each heat convector being mounted in metal-to-metal heat conductive communication with the heated manifold.

13. In an injection molding apparatus wherein a heated manifold receives an injection fluid material and delivers the injection fluid material under an injection pressure to a gate of a mold cavity, and
  an actuator comprises an actuator housing containing a drive member interconnected to a valve pin having a drive axis and wherein the valve pin is drivable along the drive axis between an upstream gate open position and a downstream gate closed position for opening and closing the gate of the mold cavity,
  a downstream end of the actuator housing being spaced a selectable distance upstream of an upstream surface of the heated manifold forming a gap between the downstream end of the actuator housing and the upstream surface of the heated manifold,
  the improvement comprising an actuator cooling apparatus including one or more heat convectors for maintaining the actuator in a relatively cool condition relative to the heated manifold, each heat convector comprised of:

a heat conductive leg configured to be disposed within the gap, the leg being isolated from direct metal-to-metal contact with the actuator housing and mounted in heat conductive communication with the heated manifold, thus maintaining the actuator in a relatively cool condition relative to the heated manifold, and a heat conductive arm configured to extend distally upstream and away from the gap, and spaced radially apart from the actuator housing relative to the drive axis, such that heat is conducted from the leg to the arm upstream and away from the downstream end of the actuator housing.

14. The apparatus of claim 13 wherein the cooling apparatus further includes a thermally insulating standoff configured to be mounted in heat conductive contact with the actuator housing, and wherein the leg of at least one of the one or more heat convectors is mounted in heat conductive contact with the thermally insulting standoff.

15. The apparatus of claim 13 wherein an upstream end of the heat conductive arm of at least one of the one or more heat convectors is disposed in heat conductive communication with a relatively cool plate that is mounted in heat conductive isolation from the heated manifold.

16. The apparatus of claim 15 wherein the heat conductive arm of the at least one of the one or more heat convectors includes a metal finger that is disposed in metal-to-metal contact under spring force with the relatively cool plate.

17. The apparatus of claim 16 wherein the metal finger is slidably mounted on the arm in engagement with a spring, the metal finger being engagable in metal-to-metal contact with the relatively cool plate under spring force exerted by the spring when compressed.

18. The apparatus of claim 13 wherein the leg of at least one of the one or more heat convectors is mounted in metal-to-metal heat conductive contact with the heated manifold.

19. The apparatus of claim 13 further comprising a valve pin bushing mounted in metal-to-metal heat conductive contact with the heated manifold, the valve pin being slidably received within a guide channel of the bushing for reciprocally driven upstream-downstream movement along the drive axis of the valve pin, wherein the leg of at least one of the one or more heat convectors is mounted in metal-to-metal heat conductive contact with the valve pin bushing.

20. The apparatus of claim 13 wherein the one or more heat convectors comprises at least first and second heat convectors, each leg of each heat convector being mounted in metal-to-metal heat conductive communication with the heated manifold.

21. The apparatus of claim 13 further comprising an actuator mount that is mounted in metal-to-metal heat conductive contact with the heated manifold, wherein the leg of at least one of the one or more heat convectors is mounted in metal-to-metal heat conductive contact with the actuator mount.

22. The apparatus of claim 13 wherein the heat conductive arm of at least one of the one or more heat convectors is spaced apart from the actuator housing extending along an axis or direction that is generally perpendicular to the drive axis.

23. The apparatus of claim 13 wherein the heat conductive arm of at least one of the one or more heat convectors is spaced apart from the actuator housing extending along an axis or direction that is generally parallel to the drive axis.

* * * * *